United States Patent [19]

Leon et al.

[11] 4,259,181

[45] Mar. 31, 1981

[54] STREAM SPLITTER FOR SPREADING PARTICULATE MATERIAL

[75] Inventors: Gonzalo S. Leon, Sudbury; Richard C. Fortier, Concord, both of Mass.

[73] Assignee: Cabot Corporation, Boston, Mass.

[21] Appl. No.: 30,565

[22] Filed: Apr. 16, 1979

[51] Int. Cl.³ .............................................. B03C 1/18
[52] U.S. Cl. .................................... 209/231; 209/254; 209/498; 222/330
[58] Field of Search ................. 209/44, 254, 219, 498, 209/433, 240, 243, 231; 222/564, 330; 162/216, 343; 210/456

[56] References Cited

U.S. PATENT DOCUMENTS

| | | | |
|---|---|---|---|
| 435,562 | 9/1890 | Gates | 209/498 |
| 543,088 | 7/1895 | Gray | 209/254 |
| 936,754 | 10/1909 | Barbour | 209/44 |
| 1,038,046 | 9/1912 | West | 209/433 |
| 1,114,097 | 10/1914 | Bell | 209/330 |
| 1,918,398 | 7/1933 | Johnson | 209/498 X |
| 1,962,358 | 6/1934 | Orvis | 209/219 |
| 1,973,439 | 9/1934 | Mason | 209/498 X |
| 2,889,042 | 6/1959 | Le Baron | 209/127 R |
| 3,266,974 | 8/1966 | Staver | 162/216 |
| 3,616,973 | 11/1971 | Hartley | 222/564 X |

FOREIGN PATENT DOCUMENTS 1590563  5/1970  France .................................. 209/254

*Primary Examiner*—Robert Halper
*Attorney, Agent, or Firm*—Jack Schuman; Lawrence A. Chaletsky; Barry R. Blaker

[57] ABSTRACT

An inlet stream of particulate material is successively split into smaller stream segments. The segments are spread across a conveyor belt in a magnetic or conductivity separator. Inlet and intermediate stages of the splitter include troughs of triangular cross section to concentrate the streams before splitting them. The flow direction is reversed in each stage to facilitate the axial concentration of the material stream.

22 Claims, 11 Drawing Figures

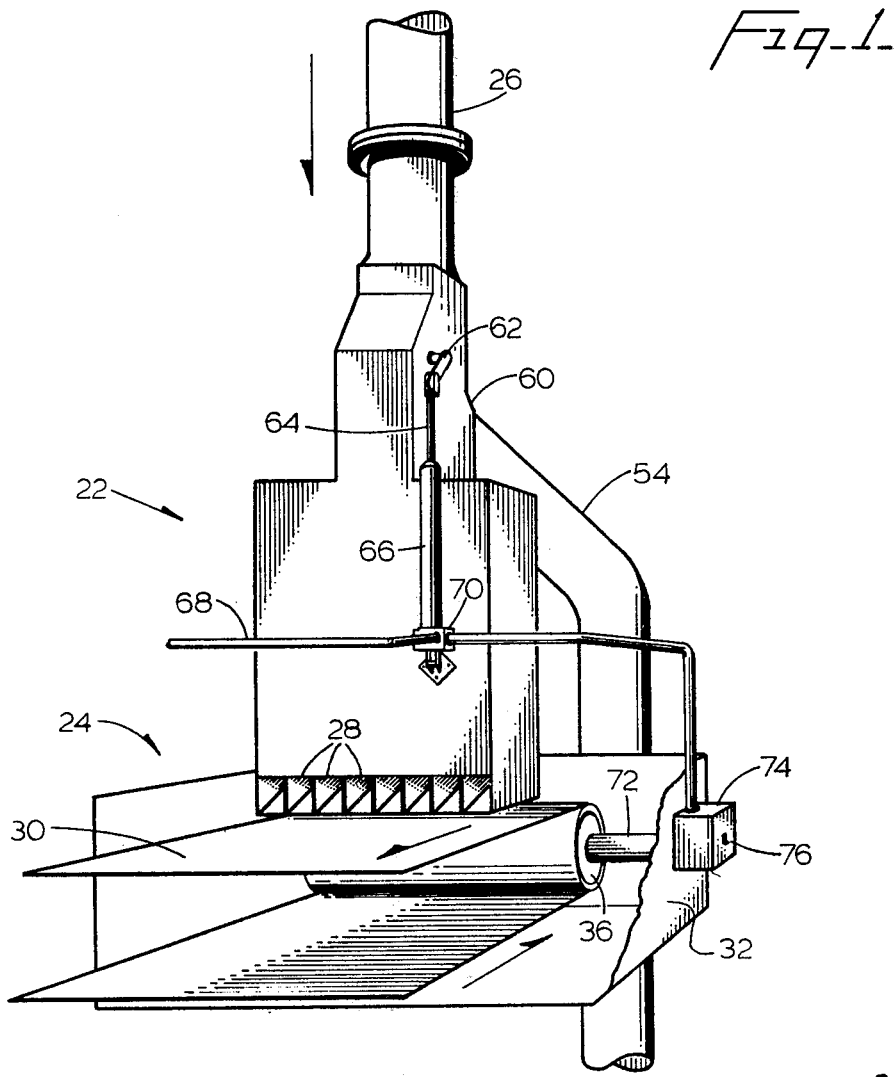
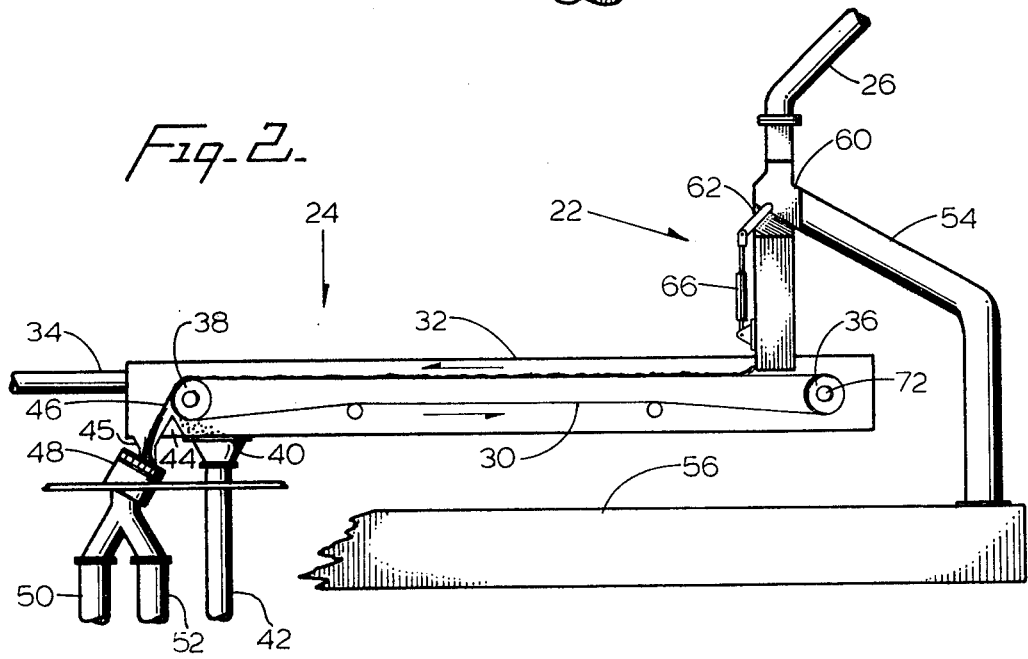

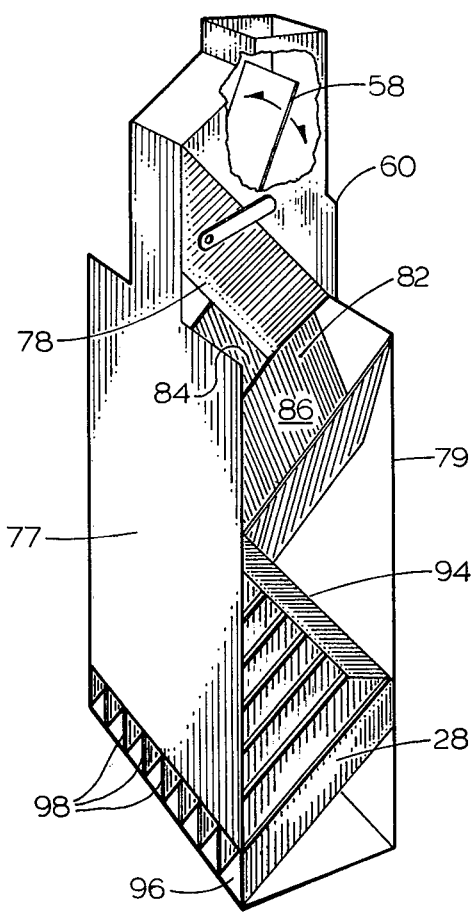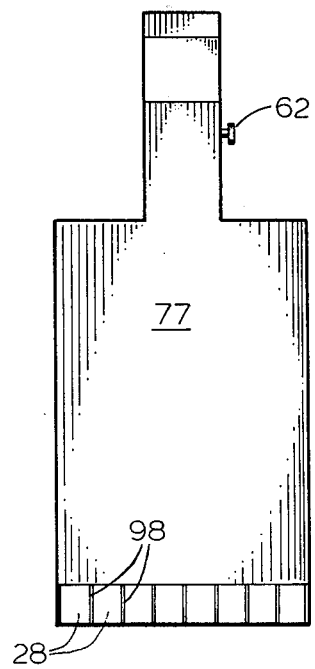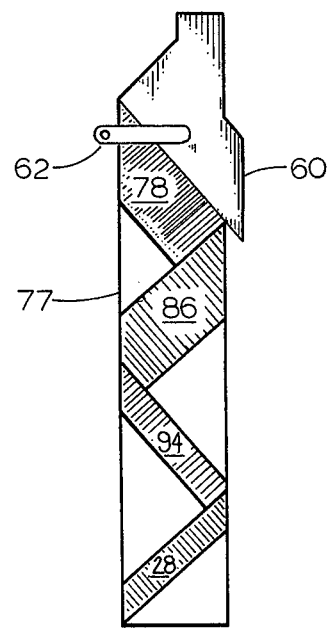

STREAM SPLITTER FOR SPREADING PARTICULATE MATERIAL

TECHNICAL FIELD

This invention relates to a gravity feed stream splitter for successively splitting an inlet stream of material into a plurality of stream segments. In particular, it relates to such a stream splitter for spreading particulate material into a flat sheet of substantially uniform thickness.

BACKGROUND ART

Carbon black, in the form of small pellets, is a major component of many synthetic rubbers such as that used in automobile tires. A problem encountered in the carbon black industry is that the pellets may be contaminated by metallic particles. One suggested method of removing that metallic material from a carbon black pellet stream is the known belt magnetic separator. The pellets are dumped onto a moving conveyor belt having a magnetic head pulley. As the conveyor reverses direction about the head pulley, the nonmagnetic carbon black pellets fall off ahead of the conveyor. However, magnetic material is held to the conveyor as it continues around the head pulley, and that material can be collected separately from the carbon black.

The magnetic pull on contaminants in the pellet stream is greatest immediately adjacent the conveyor. Thus, magnetic contaminants resting directly on the conveyor belt are easily separated. However, material set away from the conveyor belt by a pile of carbon black pellets may break free from the magnetic pull of the pulley and fall with the carbon black.

An object of the present invention is to provide a means for spreading the contaminated carbon black evenly across the conveyor belt as a thin sheet. All particles are thereby subjected to a strong magnetic pull as the conveyor belt is driven around the magnetic head pulley. Preferably, the sheet of particulate material is only about one pellet thick because the magnetic pull decreases with distance from the belt and because small magnetic particles resting on one or more carbon black pellets might be carried by those pellets in their fall away from the magnetic pulley.

DISCLOSURE OF THE INVENTION

In a gravity feed stream splitter, an inlet stream of material is split into a plurality of stream segments in stages at successively lower levels. The inlet stage includes a single inclined trough for receiving the entire inlet stream and for concentrating the stream symmetrically about the longitudinal bottom axis of the trough. There is at least one intermediate stage and each intermediate stage includes twice the number of inclined troughs as are in the preceding stage. A pair of troughs of each intermediate stage is positioned with respect to the bottom of each preceding trough to split the material from the preceding trough into substantially equal stream segments. The stream segments are then concentrated symmetrically about the longitudinal bottom axes of the respective intermediate stage troughs.

The stream splitter may be used to spread the stream into a flat sheet of substantially uniform thickness. To that end, an outlet stage includes an inclined surface for spreading stream segments from the final intermediate stage troughs. The inclined surface may have longitudinal walls thereon for splitting each stream segment of the final intermediate stage.

Preferably, the troughs are triangular in cross-section, and there are at least two intermediate stages.

In the preferred embodiment, the troughs are parallel to each other and the troughs of each stage are inclined in the reverse horizontal direction relative to the troughs of the preceding stage.

The spreader of this invention has particularly advantageous applicability in a particulate material separator. In the disclosed separators, magnetic and/or electrically conductive material is separated from carbon black pellets on a conveyor belt. However, separators for use with other than carbon black are recognized as being within the scope of this invention.

BRIEF DESCRIPTION OF THE DRAWINGS

The foregoing and other objects, features and advantages of the invention will be apparent from the following more particular description of a preferred embodiment of the invention, as illustrated in the accompanying drawings in which like reference characters refer to the same parts throughout the different views. The drawings are not necessarily to scale, emphasis instead being placed upon illustrating the principles of the invention.

FIG. 1 is a perspective view of the stream spreader positioned over the conveyor of a magnetic separator;

FIG. 2 is a side view, partially in section, of the magnetic separator system;

FIG. 3 is a perspective view of the stream spreader with the side walls broken away;

FIG. 4 is a front view of the spreader of FIG. 3;

FIG. 5 is a side view of the spreader as shown in FIG. 3;

BEST MODE OF CARRYING OUT THE INVENTION

Figure 6:
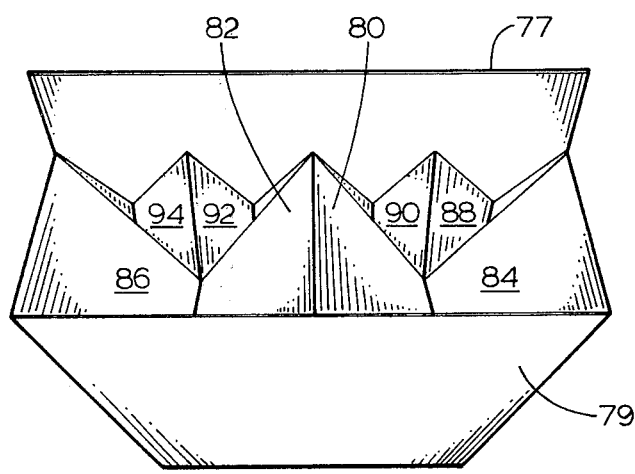
FIG. 6 is a top rear perspective view of the spreader of FIG. 3 with the top stage removed.
Figure 7:
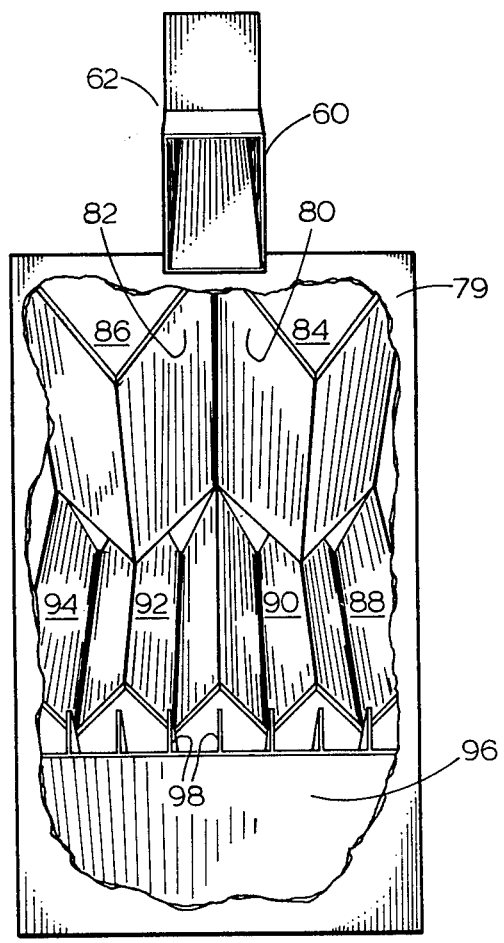
FIG. 7 is a rear perspective view of the stream spreader with the back wall broken away.

As shown in FIGS. 1 and 2, a system for separating contaminants from carbon black pellets includes a particle spreader 22 positioned over a magnetic separator 24.

Contaminated carbon black is introduced into the top of the spreader 22 through an inlet tube 26. In a manner to be discussed below the spreader 22 evenly splits the inlet stream so that uniform stream segments exit through the spreader outlet chutes 28. The carbon black drops onto the moving conveyor 30 as a flat sheet of substantially uniform thickness. By moving a conveyor of sufficient width at a sufficient speed, the resultant sheet of carbon black can be only one pellet deep.

The conveyor 30 is enclosed within a housing 32 so that carbon black dust can be drawn through an exhaust tube 34. The conveyor extends between an end pulley 36 and a head pulley 38. The head pulley is magnetic; thus any free magnetic material in the carbon black sheet is held to the conveyor belt as it passes about the pulley 38 to the lower run of the conveyor. Also, carbon black pellets having magnetic material embedded therein are held to the belt if the magnetic contaminant is a sufficiently large portion of the pellet. In this latter case, the size of the contaminant effecting separation is dependent on the magnetic strength and the belt speed.

The magnetic material carried by the head pulley and belt is dropped into a funnel 40 which directs the magnetic particles to a contaminant outlet tube 42. Clean carbon black, being nonmagnetic, is discharged from the end of the conveyor and, by its own inertia, falls beyond the separating wall 44 into a funnel 45.

In order to further clean the carbon black stream 46, the stream may be introduced into an electrical conductivity metal separator 48 such as the Metalchek 8 sold by Lock Instrumentation. Thus, nonmagnetic but electrically conductive material is diverted from the clean carbon black stream and discharged through a tube 52. The clean carbon black is discharged through tube 50 to a screw conveyor (not shown). This separator 48 may be used where relatively large segments of nonmagnetic metal are a possible contaminant. The metal detector can be tuned to ignore carbon black but to provide a reject signal when a metal segment passes.

In the event that the belt conveyor jams or electrical power is shut down, the inlet stream from tube 26 is automatically diverted to a bypass tube 54 which delivers the still-contaminated carbon black into a screw conveyor 56.

Carbon black pellets are directed into either the spreader 22 or the bypass tube 54 by a flap 58 positioned in the inlet of the spreader (FIG. 3). The flap 58 is spring biased to move it in the counter clockwise direction as viewed in FIG. 3 so that, when released, carbon black material is directed to a bypass outlet 60 connected to the bypass tube 54. An external arm 62 is fixed to the pivot rod of the flap 58. The arm 62 is also connected to a piston rod 64 extending from a pneumatic cylinder 66. High pressure air from line 68 is admitted into the pneumatic cylinder 66 by means of a solenoid controlled valve 70 to move the piston rod upwardly and thus close the bypass outlet 60.

The speed of rotation of end pulley shaft 72 is sensed by sensor circuitry in box 74. When the speed of shaft 72 is greater than some predetermined threshold and the manual switch 76 is closed, the solenoid valve 70 is energized. High pressure air is thereby admitted into the pneumatic cylinder 66 to drive the piston rod 64 upwardly The rod 64, through arm 62, causes the flap 58 to move clockwise as viewed in FIG. 3. This closes the bypass outlet 60 and directs carbon black into the spreader assembly.

If the conveyor speed drops below the threshold or the switch 76 is opened or electrical power is lost, the solenoid switch 70 is de-energized. The supply of presurized air is cut off and the pneumatic cylinder 66 is vented. With that, the spring biased flap 58 moves counter-clockwise to stop the flow of particulate material into the spreader assembly and to direct the material to the bypass tube 54. A pile up of material on the stopped conveyor is thereby avoided. The spreader will also be bypassed if there is a pressure drop in the pneumatic supply.

The spreader assembly shown in FIGS. 3-7 will now be described.

The separator shown includes an inlet stage, two intermediate stages, and an outlet stage stacked between a front wall 77 and a rear wall 79. Each stage after the first splits the inlet stream in accordance with a geometric progression, that is from one stream to two, to four and to eight.

The inlet stage includes a single inclined trough 78 of triangular cross section. The inlet trough 78 receives the entire inlet stream of contaminated carbon black diverted toward front wall 77 by the flap 58. Because the sides of the trough are inclined to a longitudinal bottom axis the stream becomes concentrated in the trough symmetrically about the bottom axis. This symmetric concentration of the particles occurs notwithstanding any bias of the inlet stream toward either side of the trough.

The thus concentrated stream descends into a pair of second stage triangular troughs 84 and 86. The stream is split equally into two stream segments by the inner trough walls 80 and 82. The stream segment in each trough 84, 86 is then concentrated symmetrically about the longitudinal bottom axis of that trough as the particles continue to flow downwardly with gravity.

The second intermediate stage of the spreader includes twice the number of troughs as are in the preceding stage. A pair of parallel triangular troughs 88 and 90 are positioned to split the stream segment from trough 84 into two equal segments. Similarly, the pair of troughs 92 and 94 are positioned with respect to the bottom axis of trough 86 to evenly split the material in that trough.

Each of the four stream segments in the second intermediate stage becomes concentrated symmetrically about the longitudinal bottom axis of its respective trough. Finally, the thus concentrated stream segments are further split by four of seven longitudinal walls 98 positioned along a flat plate 96.

The plate 96 and the walls 98 form the outlet chutes 28 of the separator. By providing a flat surface across the outlet stage, each of the eight stream segments thereon tends to spread out as it flows downwardly along plate 96. Thus the particulate material which finally drops onto the conveyor 30 is in a flat sheet of substantially uniform thickness. The slope of the plate 96 may change along its length but the plate should be transversely flat to avoid any uneven spreading of the particles.

Figure 8:
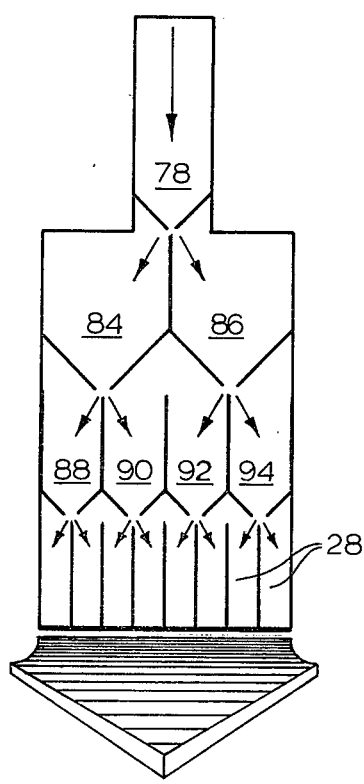
FIG. 8 is a front schematic illustration of the successive splitting of a particulate stream in the spreader of FIG. 3.
Figure 9:
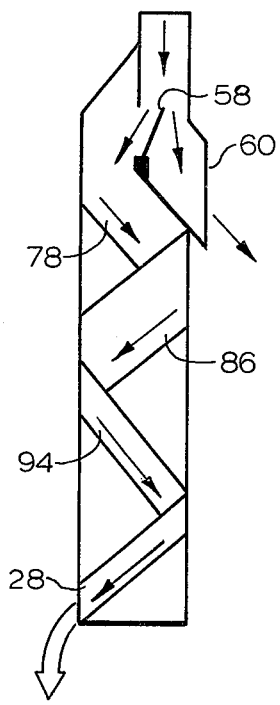
FIG. 9 is a side view similar to FIG. 5 but illustrating the flow of the particulate stream segments and the flow of a bypass stream.

The flow of particulate material in the seprator is illustrated schematically in FIGS. 8 and 9. The flap 58 is shown at a midway position in FIG. 9 to show the two alternative paths of particulate material. However, in actual use the flap 58 will be biased to one side or the other to thus cut off one of those flows.

It should be recognized that any number of intermediate stages is possible. For example, if only a limited amount of spreading is required, a single intermediate stage might be sufficient. For additional separation, additional intermediate stages might be provided, particularly for spreading a large stream across a wide conveyor.

It will be noted that each stage of the separator is inclined in a reverse horizontal direction relative to the preceding stage. This reversing flow feature results in the very compact structure shown. Also, it insures that a stream of particulate material entering a trough is concentrated along the longitudinal bottom axis of that trough. For example, the particulate material from trough 78 is pulled by gravity against the inclined walls 80 and 82 of troughs 84 and 86. Thus, while still flowing in the direction of trough 78, the material is split positively by the walls 80 and 82. The walls drive the material toward the centers of the troughs.

If the troughs were in line, with the flow in all troughs being in the same horizontal direction, there would be a tendency for the material flow to accelerate and overshoot the lower troughs. Thus longer troughs would be required. With the present arrangement the change of direction prevents the velocity build-up, thus permitting a more compact device. To that end, it is preferable that the troughs of each stage intersect the troughs of the next stage at an angle of about 90°.

Figure 10:
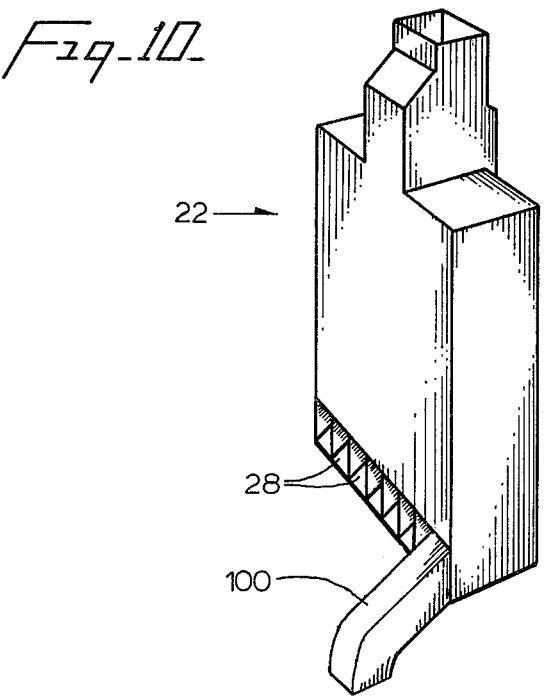
FIG. 10 is a perspective view of the spreader with an end stream segment taken off as a sample.

In FIG. 10, an end segment of the split stream is taken off through a diverting conduit 100. Such a conduit may be used in the system of FIGS. 1 and 2 to sample carbon black entering the magnetic separator. Also, any number of the outlet chutes can be similarly connected to outlet conduits for separate processing, packaging, storing or the like.

Figure 11:
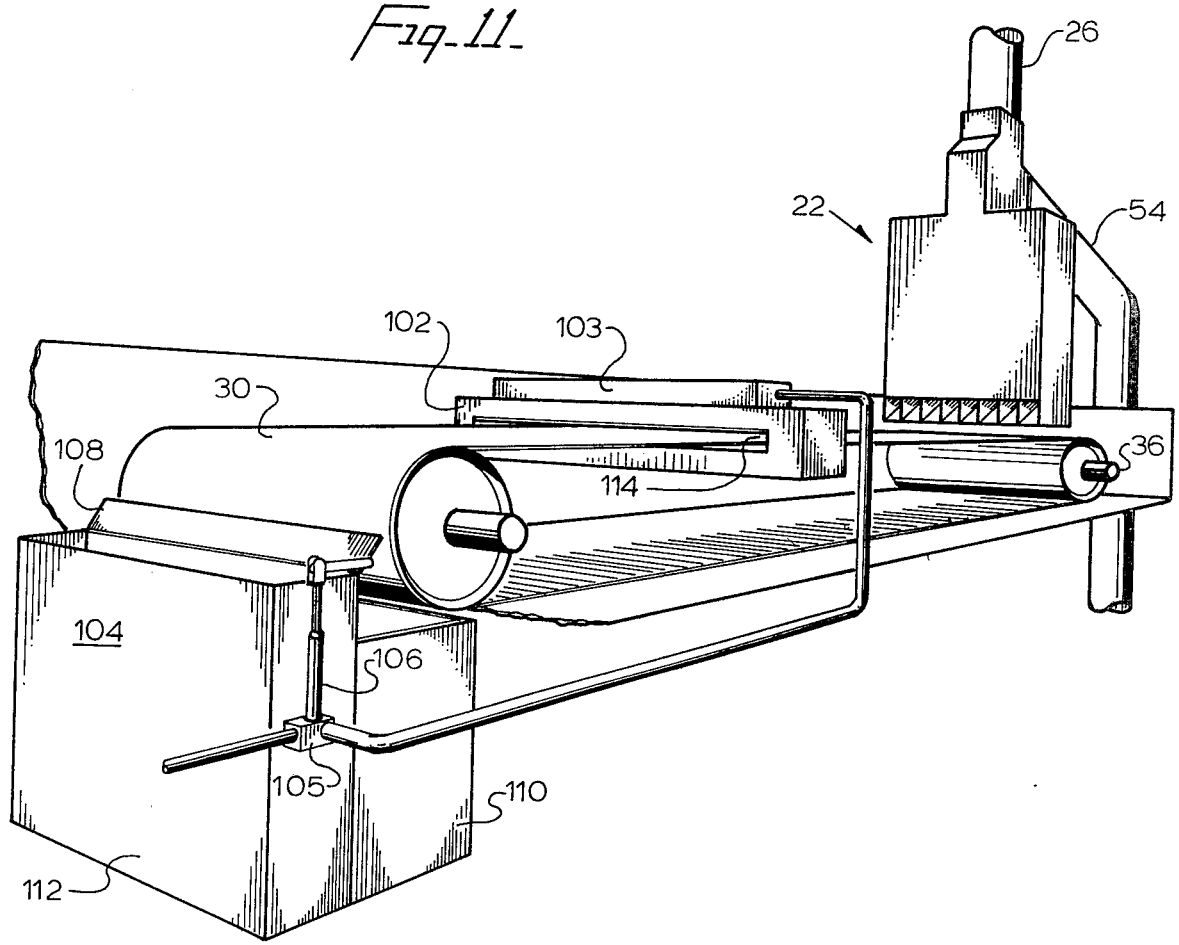
FIG. 11 is a partial perspective view of an alternative embodiment of the invention in which a sheet of particulate material passes through an electrical conductivity detector.

FIG. 11 shows another embodiment of the invention in which an electrical conductivity sensing metal detector 102 surrounds the conveyor belt 30. If metal is sensed, a signal is sent from a detector control 103 to a diverter 104 at the end of the conveyor. Then, at a time determined by the belt speed and the distance between the detector 102 and the end of the conveyor, a solenoid actuated valve 105 is deenergized to vent the air cylinder 106. This releases a spring biased flap 108 which moves counterclockwise. The length of the carbon black sheet which contains the metal is thereby diverted to a reject outlet 110. However, when no metal is detected, the valve 105 is actuated to move the flap 108 to the position shown. The carbon black is thus directed to the outlet 112.

As in the embodiment of FIG. 2, the metal detector 102 may be a Metalchek 8 by Lock Instrumentation. The sensitivity of that device is particularly dependent on the minimum dimension of the aperture 114. A narrow aperture increases sensitivity, and such an aperture is made possible by the thin sheet of carbon black provided by the spreader 22.

While the invention has been particularly shown and described with reference to preferred embodiments thereof, it will be understood by those skilled in the art that various changed in form and details may be made therein without departing from the spirit and scope of the invention as defined by the appended claims.

INDUSTRIAL APPLICABILITY

This invention may be used whenever a stream of material, especially particulate material, must be split into even segments. It has particular application to spreading such material across a conveyor belt such as in a separator. Carbon black separators have been disclosed but similar arrangements might be used in an ore enrichment process, a grain cleaning process or the like.

I claim:

1. A gravity feed stream splitter for splitting an inlet stream of material into a plurality of stream segments in stages at successively lower levels, the splitter comprising:
   an inlet stage including a single inclined inlet trough for receiving the entire inlet stream, the sides at the bottom of the inlet trough being inclined downward toward a longitudinal bottom axis of the trough for and concentrating the stream symmetrically along the longitudinal bottom axis of the trough;
   at least one intermediate stage, each intermediate stage including twice the number of inclined troughs as are in the preceding stage, a pair of troughs of the intermediate stage being positioned with respect to the bottom axis of each preceding trough to split the material from the preceding trough into two substantially equal stream segments, the sides at the bottom of each intermediate stage trough being inclined downward toward a longitudinal bottom axis of that trough for concentrating a stream segment symmetrically along the longitudinal bottom axis of the trough; and
   an outlet stage for splitting each stream segment from the final intermediate stage into two equal outlet segments.

2. A gravity feed stream splitter as claimed in claim 1 wherein the troughs are of triangular cross section.

3. A gravity feed stream splitter as claimed in claim 1 including at least two intermediate stages.

4. A gravity feed stream splitter as claimed in claim 1 wherein each stage is inclined in the reverse horizontal direction relative to the preceding stage.

5. A gravity feed stream splitter as claimed in claim 4 wherein the stages are angled with respect to each other at angles in the order of 90°.

6. A gravity feed stream splitter as claimed in claim 1 wherein the troughs of a stage run parallel to each other 7. A gravity feed stream spreader for spreading an inlet stream of material into a flat sheet of substantially uniform thickness by splitting the stream in stages at successively lower levels, the spreader comprising:
   an inlet stage including a single inclined inlet trough for receiving the entire inlet stream, the sides at the bottom of the inlet trough being inclined downward toward a longitudinal bottom axis of the trough for concentrating the stream symmetrically along the longitudinal bottom axis of the trough;
   at least one intermediate stage each intermediate stage including twice the number of inclined troughs as are in the preceding stage, a pair of troughs of the intermediate stage being positioned with respect to the bottom axis of each preceding trough to split the material from the preceding trough into two substantially equal stream segments, the sides at the bottom of each intermediate stage trough being inclined downward toward a longitudinal bottom axis of that trough for concentrating a stream sgement symmetrically along the longitudinal bottom axis of the trough; and
   an outlet stage including an inclined surface for spreading stream segments from the final intermediate stage into a flat sheet of substantially uniform thickness.

8. A gravity feed stream spreader as claimed in claim 7 wherein the troughs are of triangular cross section.

9. A gravity feed stream spreader as claimed in claim 7 including at least two intermediate stages.

10. A gravity feed stream spreader as claimed in claim 7 wherein each stage is inclined in the reverse horizontal direction relative to the preceding stage.

11. A gravity feed stream spreader as claimed in claim 10 wherein the stages are angled with respect to each other at angles in the order of 90°.

12. A gravity feed stream spreader as claimed in claim 7 wherein the troughs of a stage run parallel to each other.

13. A gravity feed stream spreader as claimed in claim 7 wherein the inclined surface of the outlet stage is divided by longitudinal walls thereon.

14. A gravity feed stream spreader as claimed in claim 7 wherein the stream segments from the outlet stage are deposited on a moving conveyor belt.

15. A gravity feed stream spreader for spreading an inlet stream of material into a flat sheet of substantially uniform thickness by splitting the stream in stages at successively lower levels, the spreader comprising:

an inlet stage including a single inclined inlet trough for receiving the entire inlet stream, the sides at the bottom of the inlet trough being inclined downward toward a longitudinal bottom axis of the trough for concentrating the stream symmetrically about the longitudinal bottom axis of the trough;

at least two intermediate stages, each intermediate stage including twice the number of inclined troughs as are in the preceding stage, the troughs being parallel to each other and inclined in the reverse horizontal direction relative to the troughs in the preceding stage, a pair of troughs of each intermediate stage being positioned symmetrically with respect to the bottom axis of a preceding trough to split the material from the preceding trough into two substantially equal stream segments, the sides at the bottom of each intermediate stage trough being inclined downward toward a longitudinal bottom axis of that trough for concentrating a stream segment symmetrically about the longitudinal bottom axis of the trough; and an outlet stage including a transversely flat inclined surface for spreading stream segments from the final intermediate stage into a flat sheet of substantially uniform thickness, the inclined surface having longitudinal walls thereon for splitting each stream segment from the final intermediate stage into two substantially equal outlet segments.

16. In a separator for separating selected material from a stream of particulate material carried by a conveyor belt, the separator including electromagnetic means for distinguishing particulate material within the stream the improvement comprising:

a gravity feed stream spreader for spreading an inlet stream of particulate material into a flat sheet of substantially uniform thickness across the conveyor belt by splitting the inlet stream in successive stages, the spreader comprising an inlet stage including a single inclined inlet trough for receiving the entire inlet stream, the sides at the bottom of the inlet trough being inclined downward toward a longitudinal bottom axis of the trough for concentrating the stream symmetrically about the longitudinal bottom axis of the trough;

at least one intermediate stage each intermediate stage including twice the number of inclined troughs as are in the preceding stage, each pair of troughs of each intermediate stage being positioned with respect to the bottom axis of preceding trough to split into the material from the preceding trough into two substantially equal stream segments, the sides at the bottom of each intermediate stage trough being inclined downward toward a longitudinal bottom axis of the trough for concentrating a stream segment symmetrically about the longitudinal axis of the trough; and an outlet stage including an inclined surface for spreading stream segments from the final intermediate stage into a flat sheet of substantially uniform thickness on the conveyor belt.

17. The improvement in a separator as claimed in claim 16 wherein the troughs are of triangular cross section.

18. The improvement in a separator as claimed in claim 16 wherein each stage is inclined in the reverse horizontal direction relative to the preceding stage.

19. The improvement in a separator as claimed in claim 16 wherein the separated material is selected by a magnetic head pulley.

20. The improvement in a separator as claimed in claim 16 wherein the separated material is selected by an electrical conductivity detector.

21. A method of splitting an inlet stream of material into a plurality of stream segments comprising:

directing the entire inlet stream into an inclined inlet trough and concentrating the stream along the longitudinal bottom axis of the trough by means of inclined sides of the trough;

splitting the inlet stream in the inlet trough into two substantially equal stream segments in an intermediate stage by means of a flow directing element having a stream dividing edge in line with the longitudinal bottom axis of the inlet trough;

concentrating each stream segment in the intermediate stage along the longitudindal bottom axis of a trough by means of inclined sides of the trough; and further splitting each of the two stream segments of the intermediate stage into four substantially equal stream segments by means of stream dividing elements, each dividing element having a stream dividing edge in line with the longitudinal bottom axis of an intermediate stage trough.

22. A method of spreading an inlet stream of particulate material into a flat sheet of substantially uniform thickness comprising:

directing the entire inlet stream into an inclined inlet trough and concentrating the stream along the longitudinal bottom axis of the trough by means of inclined sides of the trough;

splitting the inlet stream in the inlet trough into two substantially equal stream segments in an intermediate stage by means of a flow directing element having a stream dividing edge in line with the longitudinal bottom axis of the inlet trough;

concentrating each stream segment in the intermediate stage along the longitudinal bottom axis of a trough by means of inclined sides of the trough;

further splitting each of the two stream segments of the intermediate stage into at least four substantially equal stream segments by means of stream dividing elements, each dividing element having a stream dividing edge in line with the longitudinal bottom axis of an intermediate stage trough; and spreading the resulting stream segments on a transversely flat inclined surface.

* * * * *